United States Patent [19] [11] 4,117,740
Howland [45] Oct. 3, 1978

[54] MULTI-STROKE THROTTLE LINKAGE MECHANISM

[75] Inventor: Leland L. Howland, Rosemount, Minn.

[73] Assignee: Thermo King Corporation, Minneapolis, Minn.

[21] Appl. No.: 814,960

[22] Filed: Jul. 12, 1977

[51] Int. Cl.$^2$ .............................................. G01M 1/16

[52] U.S. Cl. ........................................ 74/469; 60/906; 123/97 R; 123/102

[58] Field of Search ................. 74/469, 513; 192/3 T, 192/3 S; 123/97 R, 103 E, 103 C, 102, DIG. 11, 198 DB; 60/906

[56] References Cited

U.S. PATENT DOCUMENTS

| | | | |
|---|---|---|---|
| 2,174,972 | 10/1939 | Dach | 123/102 |
| 2,505,381 | 4/1950 | Breguet et al. | 74/469 |
| 2,825,418 | 3/1958 | Kershman | 74/513 X |
| 2,878,331 | 3/1959 | Fjellstedt | 74/469 X |
| 3,030,819 | 4/1962 | Edelbrock, Jr. | 74/469 X |
| 3,619,090 | 11/1971 | Hartkopf | 74/469 |
| 3,750,984 | 8/1973 | Mouttet et al. | 74/469 |
| 3,782,488 | 1/1974 | Williamson | 74/469 |
| 3,923,020 | 12/1975 | Gilligan | 123/103 C |
| 3,952,714 | 4/1976 | Weyer | 123/103 C |
| 3,958,677 | 5/1976 | Spanelis et al. | 74/513 |

FOREIGN PATENT DOCUMENTS 2,454,061 6/1975 Fed. Rep. of Germany ....... 123/103 E

*Primary Examiner*—Leslie Braun
*Attorney, Agent, or Firm*—C. L. McHale

[57] ABSTRACT

A multi-position throttle mechanism is comprised of a link body having first and second servo devices secured thereto with the free end of the servo arm of one servo device connected to the engine frame and the free end of the arm of the other servo device connected to the throttle lever pivotally mounted on the engine whereby selective actuation of one or the other or both or neither of said servo devices results in at least three selectively different pre-set throttle positions.

4 Claims, 4 Drawing Figures

MULTI-STROKE THROTTLE LINKAGE MECHANISM

BACKGROUND OF THE INVENTION

There are many applications of prime movers to be more or less continuously operating with constant speed or power that is desired to be changed from time to time from one constant speed or power range to another constant speed or power range during the continuous period of operation. For example, transportable refrigeration units are often provided with continuously running internal combustion engines to power their refrigerant compressors and other components during use. As the refrigeration capacity or demand changes it may be desirable to change the constant running speed of the internal combustion engine and therefore a multi-position throttle actuating mechanism of linkage having different stroke lengths that may be quickly and easily selected and changed to change the predetermined constant running speed of the engine is required. For maximum flexibility of control a variable stroke throttle linkage having more than two adjustable pre-set stroke lengths is most desirable so that at least three different pre-set constant operating speeds for the engine may be selectively obtained and predetermined.

PRIOR ART STATEMENT

Applicant is not aware of any prior art showing the particular type of multi-variable stroke throttle linkage mechanism of this invention.

SUMMARY OF THE INVENTION

The with position throttle actuating linkage mechanism of the invention comprises a link body to which first and second servo devices are secured. Each servo device is provided with an arm to be extended when the device is actuated. The free end of the arm of the first one of the servo devices is attached to the engine frame and the free end of the arm of the second servo device is attached to the throttle arm that is pivotally mounted on the engine frame. When neither servo device is actuated the stroke length between the ends of the free arms is of one predetermined length to provide a first throttle position. When only the first device is actuated the stroke length between the free ends of the servo arms is a second predetermined length to provide a second throttle position. When only the second servo device is actuated the stroke length between the free ends of the servo device arms is a third predetermined length which may be different from the aforementioned stroke lengths if the respective lengths of the servo device arms are different to thereby provide another throttle position. When both of the servo devices are actuated, yet another different stroke length for the throttle linkage is obtained to thereby provide yet another throttle position. Either fast acting or slow acting servo devices may be used and in a particular modified form of the invention one of the servo devices is slow acting and the other servo device is fast acting.

DETAILED DESCRIPTION OF THE DRAWINGS

Figure 1:
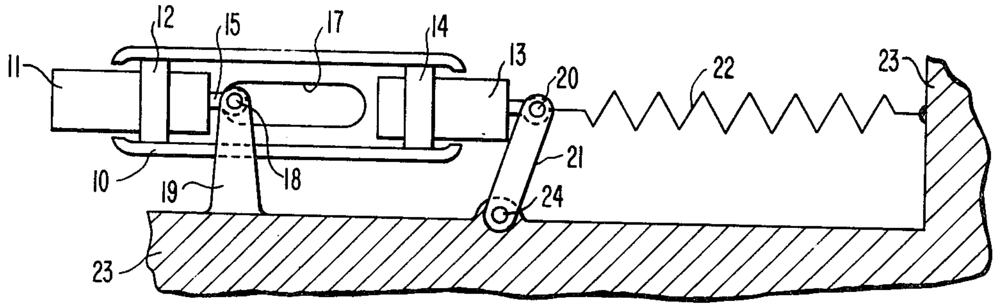
FIG. 1 is a somewhat diagrammatic showing of the throttle linkage of the invention in a first throttle position assumed when neither the first or second servo devices are actuated.

Referring to the drawings, a link body is shown at 10 to have a first servo device 11 secured to the link body 10 at the body cross member 12. A second servo device 13 is secured to the link body 10 at the body cross member 14. The servo device 11 is provided with an extendable arm 15 and the second servo device 13 is provided with an extendable arm 16. It will be noted that the length of the servo arm 15 is different than the length of the servo arm 16 and further reference will be made to this feature.

In the preferred form of the invention the link body 10 is slotted at 17 so that the free end of the arm 12 may be pinned at 18 to the engine frame 23 at 19. The free end of the second servo device arm 16 is pinned at 20 to the throttle arm 21 that is pivoted at 24 on the internal combustion engine frame 23. A throttle return tension spring 22 may be interconnected between the throttle arm 21 and the engine frame 23. Thus the tension spring 22 biases the throttle linkage in opposition to the movement of the servo device extendable arms towards their retracted positions shown by FIG. 1 of the drawings. The tension spring may not be required if the servo devices 11 and 13 are normally constrained or biased to a given position. Alternatively, temperature responsive wax motors of well-known arrangement which would be positively actuated in either direction also would not require the use of the throttle return spring 22.

Figure 2:
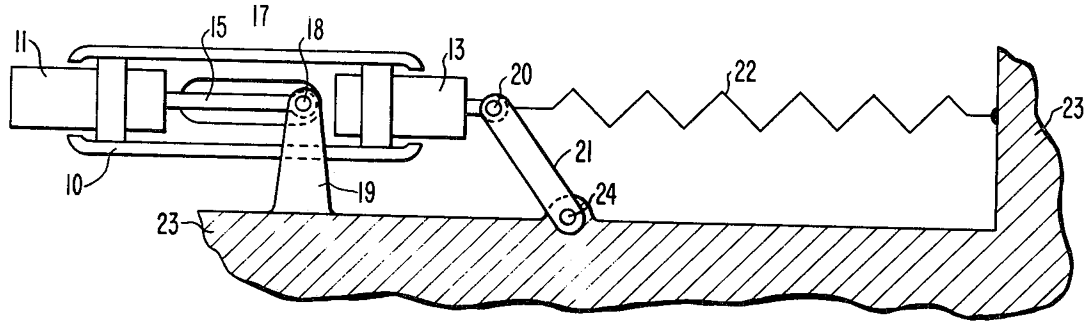
FIG. 2 is a view similar to FIG. 1 but showing the second throttle position when only the first servo device is actuated.
Figure 3:
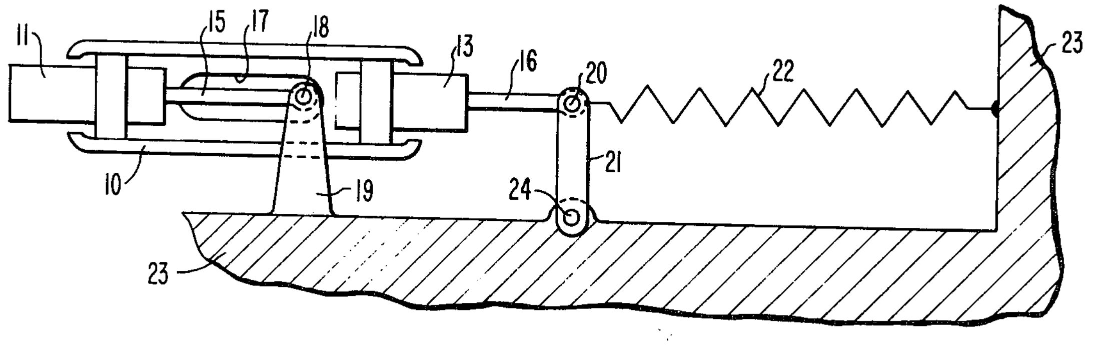
FIG. 3 is similar to FIGS. 1 and 2, showing a third throttle position when both the first and second servo devices are actuated.
Figure 4:
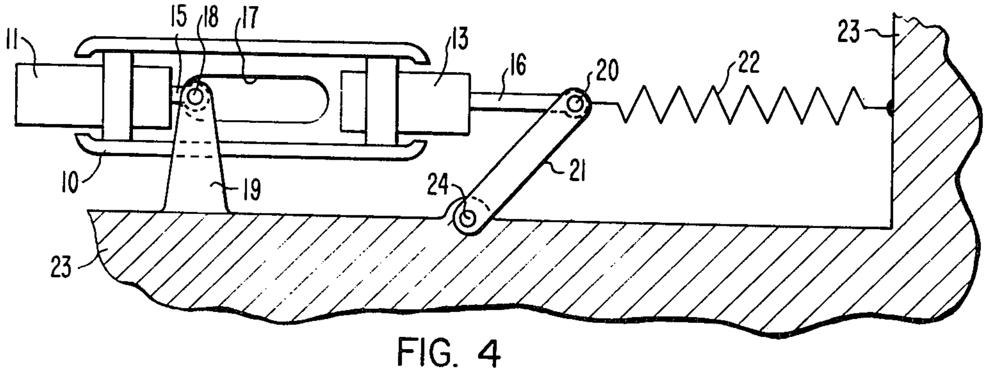
FIG. 4 is a view similar to FIGS. 1, 2 and 3, but showing the fourth throttle position assumed when only the second servo device is actuated.

In operation, when neither servo device 11 or 13 is actuated, link body 10 is moved by the spring 22 to the position shown by FIG. 1 of the drawings and the throttle lever 21 assumes the first throttle position shown. When the only first servo mechanism 11 is actuated, its servo arm 15 is extended to move the link body 10 to the left of the drawing, as shown by FIG. 2, thus fully extending the tension spring 22 and positioning the throttle arm 21 to the second throttle position as shown by FIG. 2. When both servo devices 11 and 13 are energized, the link body 10 assumes the position as shown by FIG. 3 of the drawings and the servo arm 16 is extended to provide a third different stroke length with the throttle arm 21 in the third throttle position shown by FIG. 3. This is assuming that the lengths of the actuating arms 15 and 16 are different as shown. When only the second servo device 13 is actuated, and again assuming the lengths of the arms 15 and 16 to be different, the link body 10 assumes the position as shown by FIG. 4 of the drawings and the link arm 16 is extended to provide a fourth different throttle position for the throttle arm 21.

Although the invention has been described with the use of servo devices having different lengths in order to obtain the four different throttle positions for the linkage mechanism, it should be understood that if the stroke lengths for the servo device arms 15 and 16 are the same, the stoke length for the positions of the mechanism shown by FIGS. 1 and 3 of the drawings would be the same with the throttle arm 21 pivoted to the same throttle positions and only three different throttle positions would be therefore obtained by the various actuated conditions of the servo mechanisms. Therefore, this invention should be construed to provide for such operation if desired which could be of advantage if the first servo device 11 were a quick acting device and the second servo device 13 were a slow acting device or vice versa so that although the same stroking lengths are obtained, the movement of the throttle linkage device to that stroke length could be either slow or fast depending upon which servo device were actuated to obtain that linkage length.

Various modifications of the invention are obvious to those skilled in the art. Although the servo device 11 is shown to be linked to the element 19 through a slot 17 in the link body 10, it is obvious that other arrangements for connecting the free end of the servo device arm 15 to the engine frame 23 may be provided to avoid the use of the slot 17 in the link body 10. In the preferred form of the invention each servo device 11 and 13 is a fast acting solenoid device having a self-contained spring mechanism (not shown) for normally positioning the respective arm 15 and 16 in the retracted position shown by FIG. 1 of the drawings. Thus the tension spring 22 opposes the self-contained springs of the solenoid devices 11 and 13 and could be eliminated if desired. In place of the solenoid devices 11 and 13, other servo mechanisms such as slow acting temperature responsive wax motors may be used and in such case the tension spring 22 opposes the movement of the wax motor in a particular direction but may not be required for effective operation considering the fact that the wax motor operates in a positive displacement manner in either direction.

What is claimed is:

1. A multi-position throttle mechanism for an engine having an engine frame and a pivoted throttle lever, comprising a link body, a first servo device carried by said body and having an arm extendable from a first position to a second position upon actuation of its servo mechanism, a second servo device carried by said body and having an arm extendable from a first position to a second position upon actuation of its servo mechanism, the free end of the arm of said first servo device being secured to the engine frame and the free end of the arm of the second servo device being secured to the throttle lever pivoted on the engine frame whereby selective actuation of one or the other or both or neither of said first and second servo devices results in at least three selectively different pre-set throttle positions of the throttle lever.

2. The invention of claim 1 wherein spring means is connected between said engine frame and the throttle lever in a manner to bias said linkage towards one of the throttle positions and the actuation of respective ones of said first and second servo devices causes the respective servo arms to move in opposition to said spring bias.

3. The invention of claim 1 wherein the extended length of the arm of the first servo device is different than the extended length of the arm of the second servo device so that four different pre-set throttle positions are selectively obtainable.

4. The invention of claim 1 in which one of the servo devices is a fast acting device and the other of the servo devices is a slow acting device.

* * * * *